(12) United States Patent
Hill

(10) Patent No.: US 11,767,800 B2
(45) Date of Patent: Sep. 26, 2023

(54) CONTROLLER AND A METHOD FOR CONTROLLING AN INTERNAL COMBUSTION ENGINE

(71) Applicant: JAGUAR LAND ROVER LIMITED, Warwickshire (GB)

(72) Inventor: James Hill, Coventry (GB)

(73) Assignee: JAGUAR LAND ROVER LIMITED, Coventry (GB)

( * ) Notice: Subject to any disclaimer, the term of this patent is extended or adjusted under 35 U.S.C. 154(b) by 0 days.

(21) Appl. No.: 17/619,626

(22) PCT Filed: Jun. 25, 2020

(86) PCT No.: PCT/EP2020/067926
§ 371 (c)(1),
(2) Date: Dec. 16, 2021

(87) PCT Pub. No.: WO2020/260518
PCT Pub. Date: Dec. 30, 2020

(65) Prior Publication Data
US 2022/0268226 A1    Aug. 25, 2022

(30) Foreign Application Priority Data

Jun. 26, 2019 (GB) ...................... 1909195

(51) Int. Cl.
*F02D 41/00* (2006.01)
*F02D 13/02* (2006.01)
(Continued)

(52) U.S. Cl.
CPC ..... *F02D 41/0087* (2013.01); *F02D 13/0207* (2013.01); *F02D 13/06* (2013.01);
(Continued)

(58) Field of Classification Search
CPC .. F02D 41/0087; F02D 13/0207; F02D 13/06; F02D 41/042; F02D 41/123;
(Continued)

(56) References Cited

U.S. PATENT DOCUMENTS 7,146,966 B2 * 12/2006 Nakamura .......... F02D 13/0211
123/481
2005/0066934 A1 * 3/2005 Kawamura ......... F02D 41/0005
123/493
(Continued)

FOREIGN PATENT DOCUMENTS

EP    1950395 A1 *  7/2008  ......... F02D 13/0226
EP    1950395 A1     7/2008
(Continued)

OTHER PUBLICATIONS

Combined Search and Examination Report under Sections 17 and 18(3) for Application No. GB1909195.8 dated Nov. 29, 2019.
(Continued)

*Primary Examiner* — Sizo B Vilakazi
*Assistant Examiner* — Brian R Kirby
(74) *Attorney, Agent, or Firm* — Carlson, Gaskey & Olds, P.C.

(57) ABSTRACT

Aspects of the present invention relate to a controller for controlling operation of an internal combustion engine, a control system, an internal combustion engine, a vehicle, a method and a non-transitory computer readable medium. The controller is configured to, during fuel cut, cause opening of an intake valve of a cylinder of the internal combustion engine to enable air having a mass to enter the cylinder. The mass is below a first range of masses which enable the internal combustion engine to provide combustion torque.

16 Claims, 11 Drawing Sheets

(51) Int. Cl.
 *F02D 13/06* (2006.01)
 *F02D 41/04* (2006.01)
 *F02D 41/12* (2006.01)
(52) U.S. Cl.
 CPC .......... *F02D 41/042* (2013.01); *F02D 41/123* (2013.01); *F02D 2041/001* (2013.01); *F02D 2041/002* (2013.01)
(58) Field of Classification Search
 CPC ......... F02D 2041/001; F02D 2041/002; F02D 41/062; F02D 13/0226; F02D 41/0295; F02D 41/0005; F02D 41/0275
 See application file for complete search history.

(56) References Cited

U.S. PATENT DOCUMENTS

| | | |
|---|---|---|
| 2005/0188931 A1* | 9/2005 | Akasaka ................. F01L 1/022 123/90.2 |
| 2006/0037568 A1 | 2/2006 | Arinaga et al. |
| 2006/0075990 A1 | 4/2006 | Muto et al. |
| 2006/0243040 A1* | 11/2006 | Reed .......... F01L 9/20 73/114.79 |
| 2009/0095244 A1 | 4/2009 | Leone et al. |
| 2010/0024392 A1* | 2/2010 | Mueller ................ F02D 41/405 60/284 |
| 2010/0192920 A1 | 8/2010 | Joly |
| 2010/0262351 A1* | 10/2010 | Nagashima ............... F02D 9/02 123/493 |
| 2011/0192373 A1* | 8/2011 | Kang ................... F02B 23/104 123/295 |
| 2012/0316754 A1* | 12/2012 | Narayanaswamy .. F01N 13/009 701/103 |
| 2013/0080039 A1* | 3/2013 | Nakamoto ........... F02D 41/065 701/113 |
| 2013/0255606 A1* | 10/2013 | Nishikiori ............... F02D 41/00 123/90.1 |
| 2018/0030918 A1* | 2/2018 | Gwidt ................... F02D 41/027 |
| 2019/0249614 A1* | 8/2019 | Suzuki .................... F02D 41/18 |

FOREIGN PATENT DOCUMENTS

| | | |
|---|---|---|
| JP | 2007009779 A | 1/2007 |
| JP | 2007198351 A | 8/2007 |
| JP | 4888379 B2 | 2/2012 |

OTHER PUBLICATIONS

International Search Report and Written Opinion of the International Searching Authority for International application No. PCT/EP2020/067926 dated Jan. 15, 2021.

* cited by examiner

CONTROLLER AND A METHOD FOR CONTROLLING AN INTERNAL COMBUSTION ENGINE

TECHNICAL FIELD

The present disclosure relates to a controller for controlling operation of an internal combustion engine, a control system, an internal combustion engine, a vehicle, a method and a non-transitory computer readable medium. In particular, but not exclusively it relates to a controller and a method for controlling an internal combustion engine in a road vehicle, such as a car.

BACKGROUND

Three-way catalytic convertors are known to be used to receive exhaust gases from an internal combustion engine and convert toxic gases and pollutants into less-toxic products. The catalytic converters combine oxygen with carbon monoxide and unburned hydrocarbons to produce carbon dioxide and water, and, in addition, reduce oxides of nitrogen. Such catalytic converters operate most efficiently within a particular temperature range and when the composition of gas passing through the catalytic converter is such that the ratio of constituent gases of the composition is within a particular range.

A problem with a three-way catalytic converter is that its efficiency may be adversely affected by stopping the engine or reducing the combustion torque output of the engine (i.e. the torque output of the engine resulting from the combustion of air and fuel) to zero.

When a request to stop the engine is received by a controller, for example as a result of a drivers request or an 'eco stop' function requesting shut down of the engine, the controller outputs a signal to stop fuel injection (otherwise known as a signal to cut fuel). Due to the inertia of the engine, the engine will continue to rotate after fuel supply to the engine has been stopped or cut, but typically the intake and exhaust valves will continue to open and close. As a result, air is exhausted from the engine in place of combustion products. Similarly, when the engine is restarted, air which was trapped in one or more cylinders that were stopped in the compression or exhaust stroke is exhausted before the next intake stroke of those cylinders.

This causes a problem with the catalyst becoming over oxygenated such that it cannot efficiently convert pollutants exhausted by the engine. In addition, it may contribute to the temperature of the catalyst being reduced to below its light-off temperature (the temperature below which it cannot effectively convert pollutants). The following engine start and drive-away can cause excessive NOx (nitrogen monoxide and nitrogen dioxide) production and catalyst breakthrough (i.e. pollutants passing through the catalyst without being converted). This problem is particularly prevalent in vehicles in which the engine is frequently stopped and restarted, for example vehicles equipped with stop-on-the-move capabilities and PHEVs (plug-in hybrid electric vehicles) capable of operating for extended periods of time in electric only drive.

To counteract this problem there are known control functions invoked to inject additional fuel for a period of time, or a number of intake valve events, following reinstatement of fuelling (either at engine restart or following receipt of a positive torque request during overrun) until one or more models or exhaust sensor measurements indicate that the catalyst has become re-neutralised and is above its light-off temperature. Although fuel is saved during the fuel cut phase, the fuel enriched neutralisation process counteracts some of the fuel saving and produces more emissions than maintaining air-fuel ratio control throughout.

It is an aim of the present invention to address one or more of the disadvantages associated with the prior art.

SUMMARY OF THE INVENTION

Aspects and embodiments of the invention provide a controller for controlling operation of an internal combustion engine, a control system, an internal combustion engine, a vehicle, a method and a non-transitory computer readable medium as claimed in the appended claims.

According to an aspect of the invention there is provided a controller for controlling operation of an internal combustion engine, the controller being configured to: during fuel cut, cause opening of an intake valve of a cylinder of the internal combustion engine to enable air having a mass to enter the cylinder; wherein the mass is below a first range of masses which enable the internal combustion engine to provide combustion torque. This provides the advantage that the mass of air that is output to the catalytic converter may be much smaller than would be the case if the intake valves were opened to enable a mass in the first range of masses, that is suitable for providing combustion torque, to enter the cylinder. Consequently, this causes less oxidation of the catalyst than would otherwise occur and therefore the additional fuel that is used to regenerate the catalyst after such oxidation is also reduced. Furthermore, by enabling a small mass of air to enter the cylinder, rather than keeping the intake valve closed to allow no air at all, a partial vacuum within the intake manifold can be maintained. This provides the advantage that, when the engine recommences production of combustion torque, it is done in a more controlled and smooth manner.

Optionally, said controller comprises an electronic processor having an electrical input for receiving said first request signal; and an electronic memory device electrically coupled to the electronic processor and having instructions stored therein, the processor being configured to access the memory device and execute the instructions stored therein.

Optionally, the controller is configured to cause opening of the intake valve to enable a mass of air in the first range of masses to enter the cylinder during all intake strokes of the cylinder in which fuel is combusted during a next power stroke of the cylinder.

Optionally, during fuel cut, the controller is configured to cause opening of the intake valve during each intake stroke of the cylinder to enable a mass of air in a second range of masses to enter the cylinder during each intake stroke; and a largest mass in the second range of masses is smaller than a smallest mass in the first range of masses.

Optionally, the largest mass in the second range of masses is at least 3 times smaller than the smallest mass in the first range of masses. This provides the advantage that oxidation of the catalyst is kept to a minimum, while a partial vacuum within the intake manifold may be maintained.

Optionally, the controller is configured to: receive a fuel cut request signal indicative of a request to stop fuel being supplied to the engine; and cause opening of the intake valve to enable air having a mass below the first range of masses to enter the cylinder during a next intake stroke of the cylinder next following the receipt of the request signal, in dependence on the intake valve being closed at the time of receiving the request signal.

Optionally, the controller, in dependence on a fuel cut request signal being received while the intake valve is open, or about to be opened having been scheduled, is configured to: cause air having a mass in the first range of masses to enter the cylinder; cause injection of fuel into the cylinder; cause closing of the intake valve; and subsequently cause opening of the intake valve to enable air having a mass below the first range of masses to enter the cylinder during the intake stroke of the cylinder next following said closing of the intake valve. By injecting fuel, even though the fuel cut request may have already been received, provides the advantage that, combustion products are provided to the catalyst, rather than a large quantity of air (i.e. having a mass in the first range of masses), and so unnecessary oxidation is prevented.

Optionally, the controller is configured to cause ignition of fuel in the cylinder following said closing of the intake valve, to enable combustion of the fuel in the cylinder during a next power stroke following the closing of the intake valve, and the controller is configured to cause said ignition only after a piston in the cylinder has reached top dead center. This provides the advantage that it enables the temperature of the catalytic converter to remain above its operating temperature for a longer period after the engine is stopped, and there is a higher probability of it being above its operating temperature when the engine is restarted.

Optionally, the controller is configured to: receive a start request signal indicative of a request to increase a rotational speed of an output of the internal combustion engine from zero; and cause opening of an intake valve of at least one cylinder of the internal combustion engine to enable air having a mass below the first range of masses to enter during at least a first intake stroke of the at least one cylinder and preventing injection of fuel during the at least a first intake stroke. This provides the advantage that the start-up of the engine may be made more smoothly and therefore noise, vibration and harshness may be reduced.

Optionally, the controller is configured to cause only a mass of air below the first range of masses to enter each cylinder of the internal combustion engine until: an intake stroke of a cylinder of the internal combustion engine that is expected to have its next power stroke after the internal combustion engine has reached a required speed of rotation; or the internal combustion engine has been rotated through a predefined angle. This provides the advantage that the start-up of the engine may be made more smoothly and therefore noise, vibration and harshness may be reduced.

Optionally, the controller is configured to, during fuel cut, maintain a pressure in an inlet manifold of the engine below a maximum pressure by controlling a throttle valve to close to a position that restricts a rate of flow through the throttle valve to an average rate of flow into the cylinders of the internal combustion engine.

According to another aspect of the invention there is provided a control system for controlling operation of an internal combustion engine comprising a controller according to any one of the previous paragraphs and a valve actuation means configured to cause opening of the intake valve of each cylinder of the internal combustion engine, wherein the valve actuation means is configured to control valve lift height and/or valve lift duration in dependence on a signal received from the controller.

Optionally, the valve actuation means comprises a variable valve lift system. This provides the advantage of a valve lift system that may be controlled to open the intake valves to enable just a very small mass of air to enter the cylinders of the engine during an intake stroke.

Optionally, the variable valve lift system comprises a continuous variable valve lift system and/or a hydraulic system.

Optionally, the controller of any one of the previous paragraphs or the control system of any one of the previous paragraphs, wherein the engine comprises one or more exhaust valves mechanically actuated by cams fixed to a camshaft.

Optionally, the internal combustion engine is arranged to inject fuel directly into the cylinder. This provides the advantage that fuel may be supplied to the cylinder or stopped promptly in response to a fuel cut request.

According to a further aspect of the invention there is provided a vehicle comprising the controller according to any one of the previous paragraphs, the control system according any one of the previous paragraphs or the internal combustion engine according to any one of the previous paragraphs.

According to yet another aspect of the invention there is provided a method of controlling an internal combustion engine comprising: during fuel cut, causing opening of an intake valve of a cylinder of the internal combustion engine to enable air having a first mass to enter the cylinder; wherein the first mass is below a range of masses which enable the internal combustion engine to provide combustion torque. This provides the advantage that the mass of air that is output to a catalytic converter may be much smaller than would be the case if the intake valves were opened to enable a mass in the first range of masses, that is suitable for providing combustion torque, to enter the cylinder. Consequently, this causes less oxidation of the catalyst than would otherwise occur and therefore the additional fuel that is used to regenerate the catalyst after such oxidation is also reduced. Furthermore, by enabling a small mass of air to enter the cylinder, rather than keeping the intake valve closed to allow no air at all, a partial vacuum within the intake manifold can be maintained. This provides the advantage that, when the engine recommences production of combustion torque, it may be done in a more controlled and smooth manner.

Optionally, the method comprises causing opening of the intake valve to enable a mass of air in the first range of masses to enter the cylinder, during all intake strokes of the cylinder in which fuel is combusted during a next power stroke of the cylinder.

Optionally, the method comprises, during fuel cut, causing opening of the intake valve during each intake stroke of the cylinder to enable a mass of air in a second range of masses to enter the cylinder during each intake stroke; and the largest mass in the second range of masses is smaller than the smallest mass in the first range of masses.

Optionally, the largest mass in the second range of masses is at least 3 times smaller than the smallest mass in the first range of masses. This provides the advantage that oxidation of the catalyst is kept to a minimum, while a partial vacuum within the intake manifold may be maintained.

Optionally, the method comprises: receiving a fuel cut request signal indicative of a request to stop fuel being supplied to the engine; and causing opening of the intake valve to enable air having a mass below the first range of masses to enter the cylinder during a next intake stroke of the cylinder next following the receipt of the request signal, in dependence on the intake valve being closed at the time of receiving the request signal.

Optionally, the method comprises: receiving a fuel cut request signal indicative of a request to stop fuel being supplied to the engine; and in dependence on a fuel cut request signal being received while the intake valve is open, or about to be opened having been scheduled: causing air having a mass in the first range of masses to enter the cylinder; causing injection of fuel into the cylinder; causing closing of the intake valve; and subsequently causing opening of the intake valve to enable air having a mass below the first range of masses to enter the cylinder during the intake stroke of the cylinder next following said closing of the intake valve. This provides the advantage that it enables the temperature of the catalytic converter to remain above its operating temperature for a longer period after the engine is stopped, and there is a higher probability of it being above its operating temperature when the engine is restarted.

Optionally, the method comprises causing ignition of fuel in the cylinder following said closing of the intake valve, to enable combustion of the fuel in the cylinder during a next power stroke following the closing of the intake valve; and said ignition is caused to occur only after a piston in the cylinder has reached top dead center. This provides the advantage that it enables the temperature of the catalytic converter to remain above its operating temperature for a longer period after the engine is stopped, and there is a higher probability of it being above its operating temperature when the engine is restarted.

Optionally, the method comprises, during fuel cut, maintaining a pressure in an inlet manifold of the engine below a maximum pressure by controlling a throttle valve to close to a position that restricts a rate of flow through the throttle valve to an average rate of flow into the cylinders of the internal combustion engine. This provides the advantage that, after a temporary fuel cut period, when the engine is restarted, combustion torque production may be accurately controlled, while oxidation of the catalyst during the fuel cut period is kept to a minimum.

Optionally, the method comprises receiving a start request signal indicative of a request to increase a rotational speed of an output of the internal combustion engine from zero; and causing opening of an intake valve of at least one cylinder of the internal combustion engine to enable air having a mass below the first range of masses to enter during at least a first intake stroke of the at least one cylinder and preventing injection of fuel during the at least a first intake stroke.

Optionally, the method comprises causing only a mass of air below the first range of masses to enter each cylinder of the internal combustion engine until: an intake stroke of a cylinder of the internal combustion engine that is expected to have its next power stroke after the internal combustion engine has reached a required speed of rotation; or the internal combustion engine has been rotated through a predefined angle.

Optionally, the method comprises controlling valve lift height and/or valve lift duration in dependence on a signal received from the controller. Optionally, the method comprises controlling a variable valve lift system. Optionally, the method comprises controlling a continuous variable valve lift system and/or a hydraulically actuated variable valve lift system. Optionally, the method comprises controlling injection of fuel directly into the cylinder.

According to another aspect of the invention there is provided a non-transitory computer readable medium comprising computer readable instructions that, when executed by a processor, cause performance of a method according to any one of the previous paragraphs.

Within the scope of this application it is expressly intended that the various aspects, embodiments, examples and alternatives set out in the preceding paragraphs, in the claims and/or in the following description and drawings, and in particular the individual features thereof, may be taken independently or in any combination. That is, all embodiments and/or features of any embodiment can be combined in any way and/or combination, unless such features are incompatible. The applicant reserves the right to change any originally filed claim or file any new claim accordingly, including the right to amend any originally filed claim to depend from and/or incorporate any feature of any other claim although not originally claimed in that manner.

BRIEF DESCRIPTION OF THE DRAWINGS

One or more embodiments of the invention will now be described, by way of example only, with reference to the accompanying drawings, in which.

DETAILED DESCRIPTION

Figure 1:
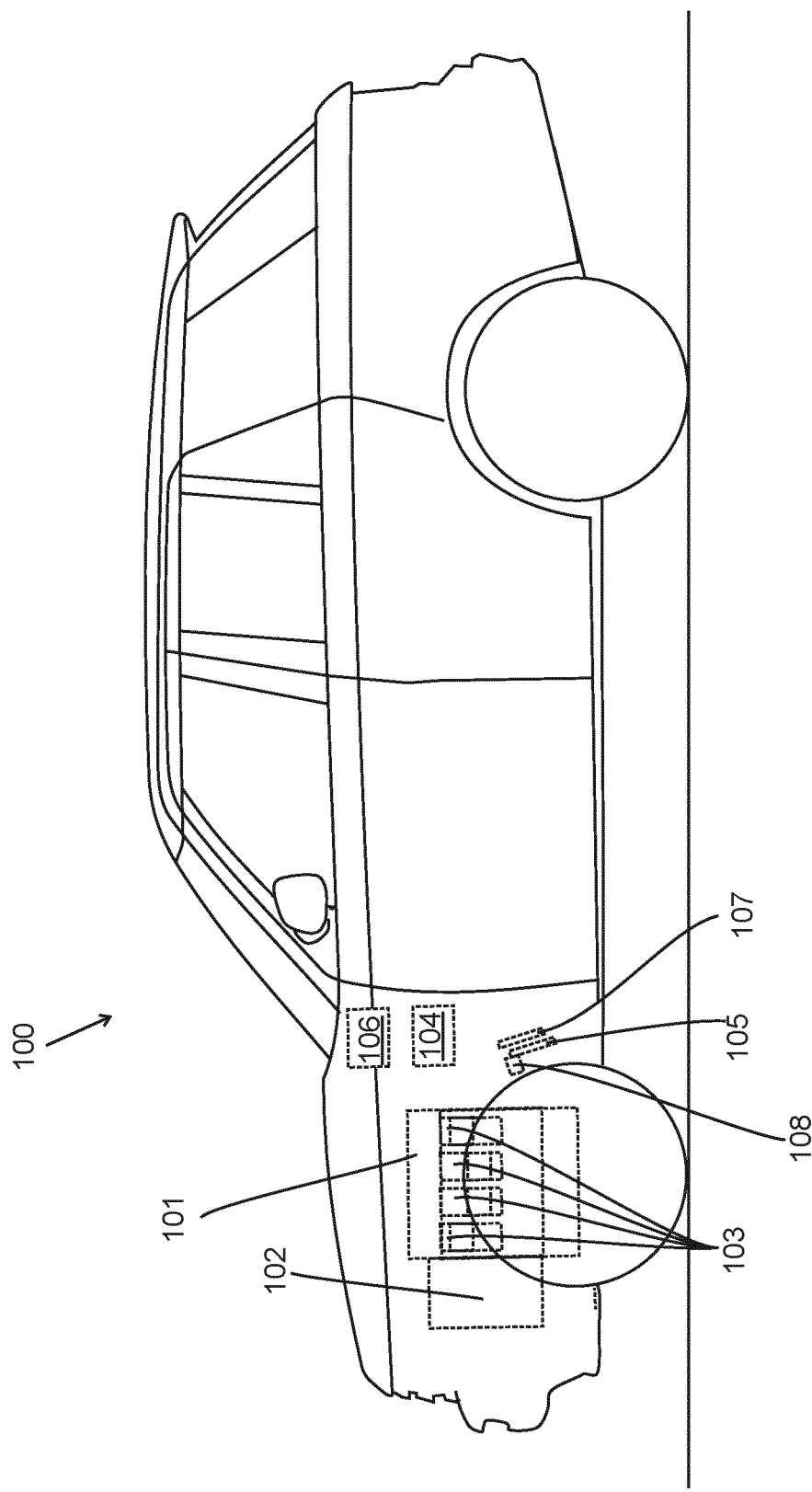
FIG. 1 shows a vehicle embodying the present invention.

A vehicle 100, a control system 201, a controller 104, a method 400 and a non-transitory computer readable medium 210 in accordance with an embodiment of the present invention is described herein with reference to the accompanying Figures.

With reference to FIG. 1, the vehicle 100 is a road vehicle in the form of a car. The vehicle 100 comprises an internal combustion engine 101 (referred to below as the engine 101) and a secondary torque source 102 for turning the engine 101 over to start it. The secondary torque source 102, in the present embodiment, is in the form of a belt integrated starter generator 102 configured to rapidly increase the rotational speed of the output of the engine 101 from zero when it is to be restarted. In the present embodiment the engine 101 is a four-stroke petrol (i.e. gasoline) engine comprising four cylinders 103, but it will be appreciated that other embodiments may comprise less than or more than four cylinders.

The vehicle 100 comprises an accelerator pedal 105, including an accelerator pedal sensor 108 configured to provide a signal indicative of the position of the accelerator pedal 105, and a brake pedal 107 to enable a user to control the speed of the vehicle 100.

The vehicle 100 also comprises a controller 104 in the form of an engine control unit (ECU) configured to control operation of the engine 101. Amongst other things, the controller 104 is arranged to control fuel injection into the cylinders 103 of the engine 101 in response to signals received from various components of the vehicle 100 including the accelerator pedal sensor 108 and a vehicle starting system 106 that is configured to receive user inputs indicative of user requests to switch on the vehicle 100 or switch off the vehicle 100. The starting system 106 may comprise a user operable switch and a smart key detection means, or an ignition key switch, or other means of enabling a user to provide indications that the engine 101 is to be started or stopped.

Figure 2:
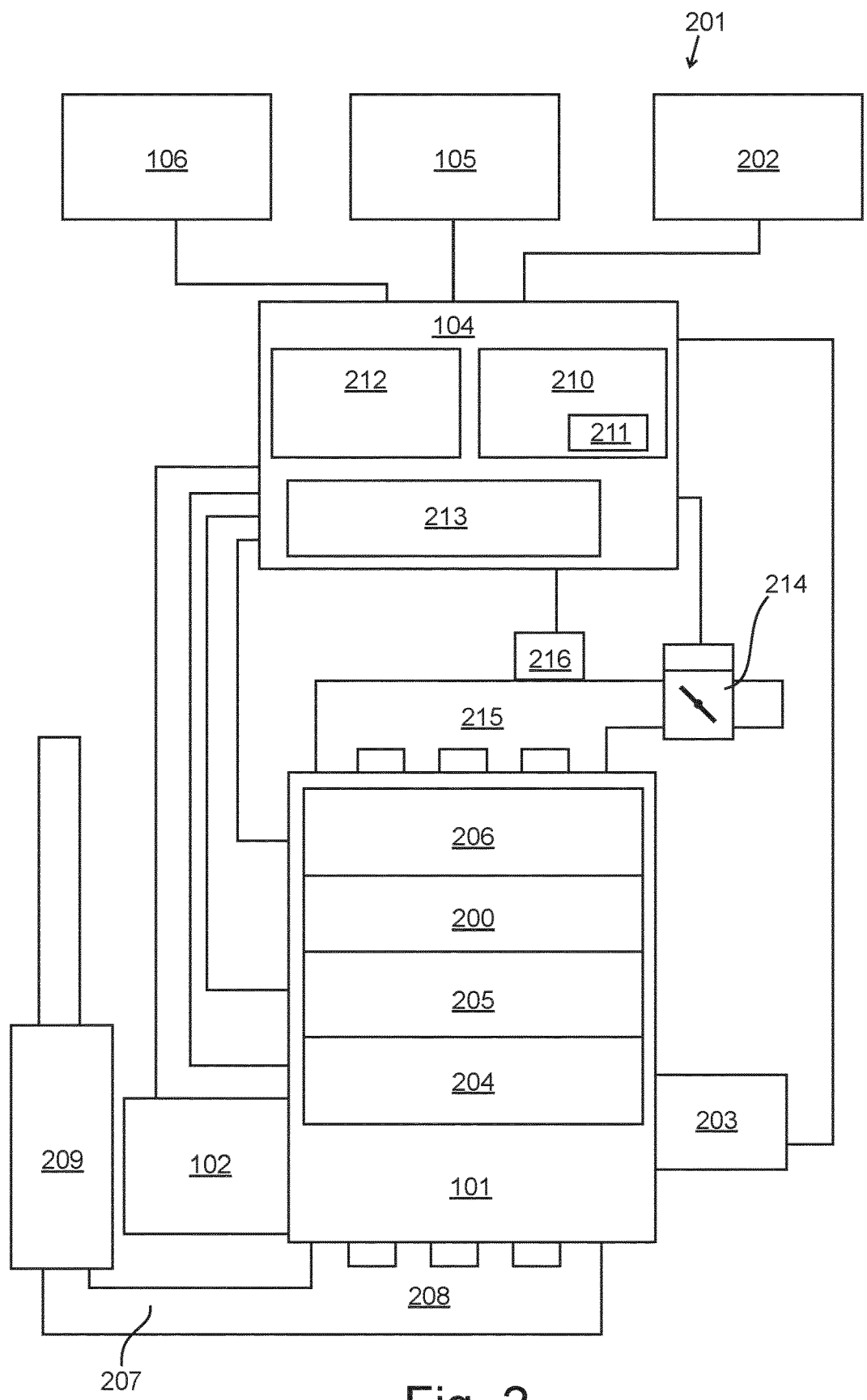
FIG. 2 shows schematically a control system and internal combustion engine embodying the present invention.

The controller 104 forms a part of a control system 201, shown schematically in FIG. 2, which is arranged to control operation of the engine 101. As well as receiving input signals from the starting system 106 and the accelerator pedal sensor 108, the controller 104 is also arranged to receive input signals from a brake system 202 of the vehicle 100 indicative of user requests that are input at the brake pedal 107 (shown in FIG. 1). It also receives input signals from a sensing device 203 arranged to sense the position of the crankshaft (318 shown in FIG. 3) of the engine 101 and a pressure sensor 216 provided on an intake manifold 215 of the engine 101, which provides a signal indicative of the air pressure in the intake manifold.

In the present embodiment the sensing device 203 comprises a pair of Hall Effect sensors that are positioned to detect the orientation of the flywheel (not shown) of the engine 101.

In response to received input signals, the controller 104 is configured to provide output signals to various components of the control system 201 that control operation of the engine 101, including: fuel injectors 204 for controlling the mass of fuel injected into the cylinders 103 of the engine 101; an ignition system 205 for igniting a fuel and air mixture within the cylinders 103; and a valve actuation means 206 for actuating intake valves 200 of the cylinders 103 of the engine 101. In the present embodiment the valve actuation means 206 is a continuous variable valve lift (CWL) system 206, but in alternative embodiments the valve actuation means 206 may comprise a discrete variable valve lift system.

Air is supplied to the engine 101 via a throttle valve 214 and the intake manifold 215 positioned downstream of the throttle valve 214. In the present embodiment, the throttle valve 214 is an electronically controlled throttle valve that operates in response to signals received from the controller 104. However, in alternative embodiments, the throttle valve 214 may be operated by mechanical linkage to the accelerator pedal 105 and comprise a sensor that provides a signal indicative of its position to the controller 104.

If the engine 101 is not running and a request signal is received by the controller 104 indicating that the engine 101 is required to produce combustion torque, the controller 104 may provide an output signal to the secondary torque means 102 to cause it to turn the engine 101 over and provide output signals to the throttle valve 214, the valve actuation means 206, the fuel injectors 204 and ignition system 205 to cause the engine 101 to be started.

During operation of the engine 101, exhaust gases are transported from the engine 101 via an exhaust system 207 comprising an exhaust manifold 208 and a three-way catalytic converter 209. During normal operation of the engine 101, i.e. when it is producing combustion torque, the controller 104 is configured to provide output signals to the throttle valve 214, the valve actuation means 206, the fuel injectors 204 and the ignition system 205. By providing such signals, the controller 104 is able to cause a required mass of air to be drawn into the cylinders 103, cause injection of fuel into the cylinders 103 and cause ignition of the fuel and air mixture, at scheduled times within the four-stroke combustion cycle of the cylinders 103.

The engine 101 is a direct injection internal combustion engine 101 and therefore, typically, for each cylinder 103, the intake valve 200 (or the intake valves 200, in embodiments where there are several) are opened and closed during an intake stroke, and fuel is injected into the cylinder 103 during the intake stroke so that the injected fuel is mixed with air drawn in past the open intake valves 200. The ignition system 205 then ignites the fuel and air mixture, typically towards the end of a compression stroke, so that the mixture burns during the following power stroke. The combustion products are then exhausted from the engine 101 in the following exhaust stroke before the cycle begins again with a further intake stroke. The timings of opening and closing of the intake valves 200, the fuel injections and the ignition are scheduled by the controller 104 in dependence on timing signals received from the sensing device 203.

In the present embodiment, the controller 104 includes a valve control module that is configured to cause the valve actuation means 206 to open and close the intake valves 200 in accordance with the schedule that is determined by the controller 104. However, in alternative embodiments, the valve control module may be provided in a separate electronic control unit, and the controller 104 causes opening and closing of the intake valves 200 by providing data defining the schedule to that separate control unit.

The quantity of fuel injected into the cylinders 103 is determined by the controller 104 to be consistent with a mass of air that is drawn in to the cylinders 103 during intake strokes. Typically, the controller 104 determines the mass of air and fuel to produce a stoichiometric mixture for combustion. The mass of air drawn into the cylinders 103 depends on the position of the throttle valve 214, the timing of the opening and closing of the intake valves 200 and the height to which they are lifted during opening. During normal operation of the engine 101, it draws air into its cylinders 103 during their intake strokes, and restrictions on air flow into the intake manifold 215, such as the throttle valve 214, cause a reduction in air pressure in the intake manifold 215. However, the reduced pressure in the intake manifold 215 is accounted for by the controller 104 when it determines the mass of air that is drawn into the cylinders 103.

During normal operation of the engine 101, the controller 104 may receive a signal requiring that no combustion torque should be produced by the engine 101, i.e. indicating that fuel provided to the engine 101 is to be stopped or cut. If the engine 101 is running, and a signal is received indicating that fuel provided to the engine 101 is to be stopped, the controller 104 co-ordinates stopping of fuel supply to the engine 101 and stopping of ignition of the air-fuel mixture so that the engine 101 stops producing combustion torque. In addition, as will be described in further detail below, the controller 104 also co-ordinates closing of the throttle valve 214 and co-ordinates opening and closing of the valve actuation means 206 to cause only a relatively small mass of air to be drawn into the cylinders 103 from the intake manifold 215 during intake strokes. To achieve this, in the present embodiment, the controller 104 causes the valve actuation means 206 to open the intake valves 200 with a relatively small lift and for a relatively short period of time. In alternative embodiments, the controller 104 may cause the valve actuation means 206 to open the intake valves 200 with a relatively small lift or alternatively for a relatively short period of time, so that only a relatively small mass of air is drawn into the cylinders 103 from the intake manifold 215 during intake strokes.

In the present embodiment, the controller 104 is configured to stop and start the engine 101 in accordance with requirements for combustion torque to be produced by the engine 101. Thus, a fuel cut signal (otherwise known as a signal that fuel supply is to be stopped) received at the controller 104 could be received from the starting system 106 which has received a user input indicating that the engine 101 is to be switched off. Alternatively, the fuel cut signal may be received from the accelerator pedal sensor 108 indicating that the user has released the accelerator pedal 105 and no torque is required to be produced by the engine 101, or the fuel cut signal may be received by the controller 104 from the brake system 202, which has received a user input at the brake pedal 107 requesting that the vehicle 100 is to slow down.

Similarly, when the engine 101 is not producing combustion torque, the controller 104 is configured to cause reinstatement of fuel supply to the engine 101 in dependence on receiving a request signal indicating that positive engine torque is required. For example, the request signal may be generated by the accelerator pedal sensor 108, following a period in which the engine 101 has not been running at all, or at a time when the engine 101 is still turning over due to momentum after it has previously generated combustion torque.

As mentioned above, the mass of air drawn into the cylinders 103 is reduced during a fuel cut period. By reducing the mass of air drawn into the cylinders 103 during fuel cut period, excessive quantities of oxygen are prevented from reaching the three-way catalytic converter 209 and causing undue oxidation of the catalyst. Consequently, when the engine 101 is restarted only a relatively small excess of fuel is required in the air to fuel ratio in order to cause a required reduction of the oxidized catalyst.

During a fuel cut period, the throttle valve 214 is closed to a position in which it only allows a relatively very small rate of flow of air into the intake manifold 214, and by opening the intake valves 200 during a fuel cut period, the air pressure in the intake manifold 214 can be maintained at a level which is below a maximum pressure and which is similar to the air pressure present during normal operation of the engine 101.

An advantage of maintaining such a low air pressure in the intake manifold 215 may be found, for example, when the vehicle 100 is travelling along a road and a driver of the vehicle 101 temporarily releases the accelerator pedal 108 to indicate that no combustion torque is required from the engine 101 and then reapplies pressure to the accelerator pedal 108 to request combustion torque. I.e. the vehicle 100 is caused to travel while the engine 101 provides combustion torque, continues travelling during a brief period in which fuel is cut but the engine 101 continues to rotate due to momentum, and then continues travelling following resumption of production of combustion torque by the engine 101.

In this scenario, the controller 104 receives a signal that indicates a requirement for combustion torque until it receives a signal requesting that fuel to the engine 101 is to be cut and then soon after receives a signal requesting resumption of combustion torque production by the engine 101. When the controller 104 receives the request for resumption of combustion torque, it is able to determine the required timings for opening and closing of the intake valves 200 to cause a required mass of air to be drawn into the cylinders 103 for the requested combustion torque, based on a usual pressure of air being present in the intake manifold 215. Thus, the controller 104 is able to cause the engine 101 to resume production of combustion torque with an accurately determined ratio of air to fuel. In contrast, if the intake valves 200 were not opened at all during the fuel cut period, leakage of air around the throttle valve 214 would allow the pressure in the intake manifold 215 to rise towards atmospheric pressure and the schedule determined by the controller 104 to resume engine torque production would result in an overly large mass of air being drawn into the engine 101. This typically has the effect of generating a sudden, temporary surge in torque that would be apparent and undesirable to the occupants of the vehicle 100 and that could adversely affect the control that the driver has over the vehicle 100.

In the present embodiment, the controller 104 comprises at least one memory device 210, which stores instructions 211, and at least one processor 212 configured to access the memory device 210 and execute the stored instructions 211 so that the controller 104 is configured to perform the methods described herein by controlling the secondary torque source 102, the throttle valve 214, the valve actuation means 206, the ignition system 205 and the fuel injectors 204. The controller 104 also comprises an input/output means 213 of the controller 104 to receive input signals from, and provide output signals to, other components of the vehicle 100. The input/output means 213 may include a transceiver for providing data communication over a data bus, such as a CAN (controller area network) bus.

Figure 3:
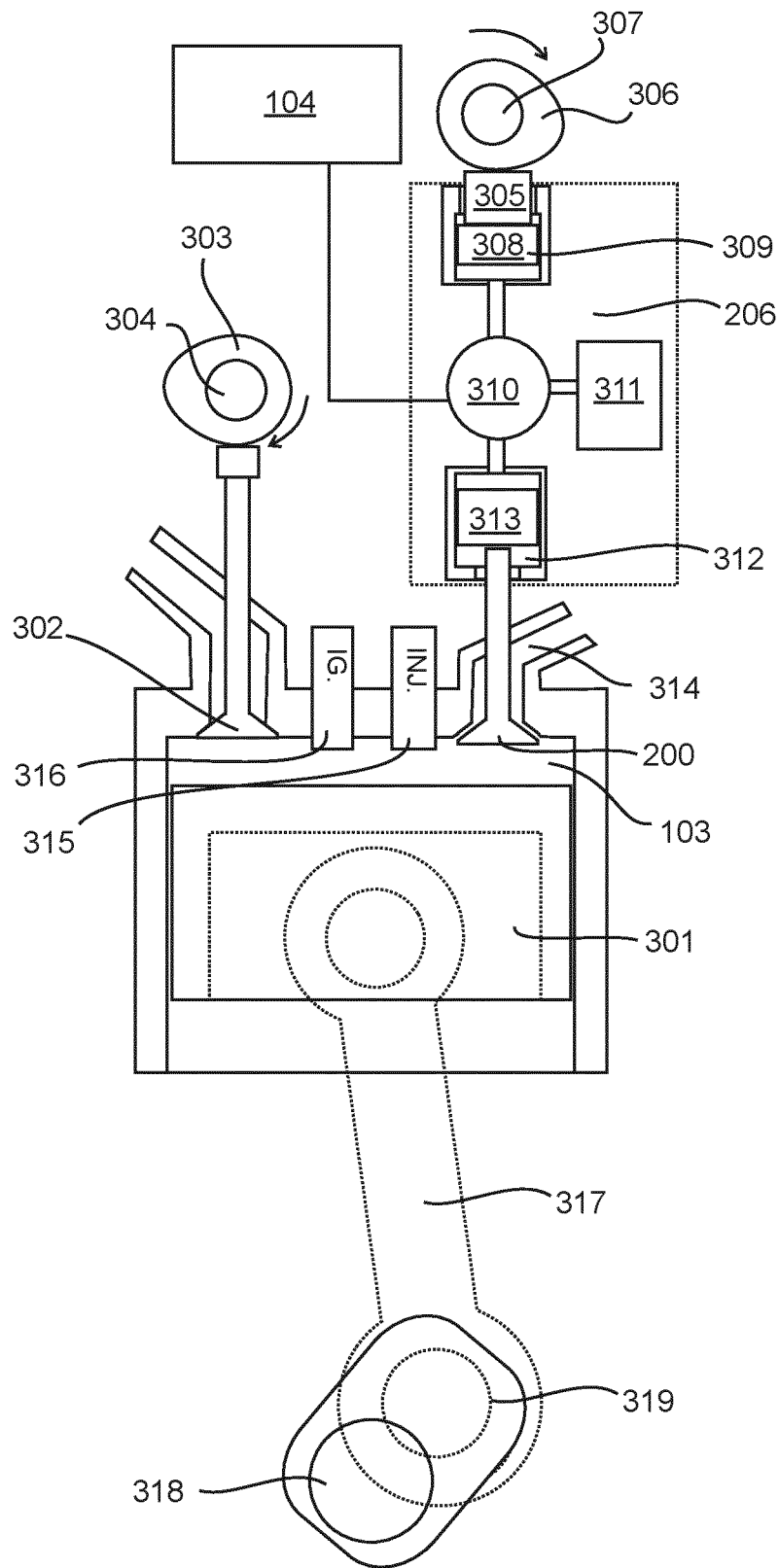
FIG. 3 shows details of a valve actuation means of the control system of FIG. 2.

Further details of the valve actuation means 206 of the control system 201 is illustrated in FIG. 3, which shows one of the cylinders 103 of the engine 101 containing a piston 301. FIG. 3 also shows the mechanisms by which an intake valve 200 and an exhaust valve 302 of the cylinder 103 are actuated. It should be understood that although only one cylinder 103 with one intake valve 200 is illustrated in FIG. 3, the intake valves 200 of the other cylinders 103 may be actuated in a similar manner. Also, in other embodiments, each cylinder 103 may have more than one intake valve 200 and where the present specification refers to the operation of the intake valve 200 of a cylinder 103, it also applies to the operation of all of the intake valves 200 of a cylinder 103 that has multiple intake valves 200. i.e. A reference to an intake valve 200 of a cylinder 103 being open, opening, being closed or closing, should be understood to be a reference to all of the intake valves 200 of a cylinder 103 being open, opening, being closed or closing in respect of an embodiment with multiple intake valves 200 for each cylinder 103.

In the present embodiment, the valve actuation means 206 comprises a hydraulic system of a known type which is arranged to actuate only the intake valves 200 of the engine 101. The exhaust valves 302 are actuated by direct mechanical interaction with a cam 303 on a camshaft 304, but in an alternative embodiment, the exhaust valves 302 may also be actuated by a continuous variable valve lift (CWL) system in a similar manner to the intake valves 200.

The valve actuation means 206 comprises a cam follower 305 which is arranged to be actuated by a cam 306 located on a camshaft 307 of the engine 101. When actuated, the cam follower 305 actuates a piston 308 in a master cylinder 309 of the hydraulic system. The master cylinder 309 is hydraulically connectable via a solenoid valve 310 to a reservoir means 311 and a slave cylinder 312, which contains a piston 313. In the present embodiment, the solenoid valve 411 is biased so that connection is normally provided between the master cylinder 410 and the reservoir means 412. To actuate the intake valve 200, the solenoid valve 310 is activated to connect the master cylinder 309 to the slave cylinder 312 and isolate it from the reservoir means 311; actuation of the master cylinder 309 then causes actuation of the slave cylinder 312. When the solenoid valve 310 is deactivated, in response to a signal from the control system 104, it enables hydraulic fluid to be released into the reservoir means 311 from the master cylinder 309 and/or the slave cylinder 312, to prevent actuation of the slave cylinder 312 or allow the piston 313 of the slave cylinder 312 to return to its retracted position.

The piston 313 of the slave cylinder 312 is arranged to actuate the intake valve 200. When the intake valve 200 is actuated, as illustrated in FIG. 3, the intake valve 200 is displaced from an intake port 314 of the cylinder 103 to allow air to be drawn into the cylinder 103.

During normal operation of the engine 101, the solenoid valve 310 provides connection between the master cylinder 309 and the slave cylinder 312, at least for a part of the period in which the cam 306 actuates the piston 308 of the master cylinder 309, during the intake stroke of the piston 301. Consequently, the piston 313 of the slave cylinder 312 is hydraulically actuated and pushes the intake valve 200 to an open position, as shown in FIG. 3. As the cam 306 is further rotated, it releases its pressure applied to the piston 308, allowing hydraulic fluid to return to the master cylinder 309, and the intake valve 200 to return to a closed position in which it closes the intake port 314.

However, in response to a signal from the controller 104, the solenoid valve 310 may be moved to connect the master cylinder 309 to the reservoir means 311, so that actuation of the piston 308 in the master cylinder 309 cannot cause actuation of the piston 313 in the slave cylinder 312 and the piston 313 in the slave cylinder 312 is caused to remain or return to its retracted position, in which it allows the intake valve 200 to remain or return to its closed position, to prevent air from entering the cylinder 103.

As illustrated in FIG. 3, a fuel injector 315 is positioned to provide an injection of fuel directly into the cylinder 103, and an ignition device 316, such as a spark plug, is provided to ignite fuel and air mixtures present within the cylinder 103 during normal operation.

In the present embodiment, during periods in which fuel to the engine 101 is cut, the controller 104 causes the solenoid valve 310 to hydraulically connect the master cylinder 309 to the slave cylinder 312 during a short period beginning at the start of the intake stroke of the piston 301 and then causes the solenoid valve 310 to connect the slave cylinder 312 to the reservoir 311 at the end of that period. During the short period at the start of the intake stroke of the piston 301, the flank of the cam 306 only moves the cam follower 305 a relatively small distance, as illustrated in FIG. 3, and consequently the intake valve 200 is only lifted by a relatively short distance.

The piston 301 of the cylinder 103 is connected by a connecting rod 317 to a crank pin 319 of the crankshaft 318 of the engine 101. As the piston 301 moves from top dead centre at the start of its intake stroke and the crank pin 318 rotates around the axis of the crankshaft 318, the velocity of the crank pin 319 only has a relatively small component in the direction of movement of the piston 301. Consequently, during the short period for which the intake valve 200 is open, the piston 301 moves relatively slowly from top dead centre and only creates a relatively small volume within the cylinder 103. Thus, this enables an accurate, small mass of air to be drawn into the cylinder 103 before the intake valve 200 is closed.

In alternative embodiments, the valve actuation means 206 may comprise another type of variable valve lift system, such as an electrical system comprising solenoids or electric motors that are arranged to actuate the intake valves 200 of the engine 101 directly.

Figure 4:
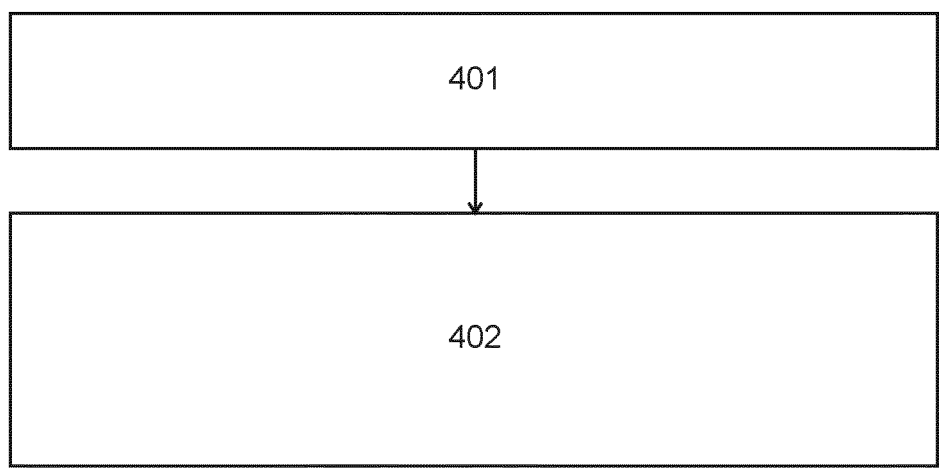
FIG. 4 shows a flowchart illustrating a method performable by a controller for controlling operation of an internal combustion engine.

A flowchart illustrating a method 400 performable by the controller 104 for controlling operation of an internal combustion engine 101 is shown in FIG. 4. At block 401 of the method 400 a first request signal indicative of a request to cut fuel to the engine 101 is received. At block 402, during fuel cut, an intake valve 200 of a cylinder 103 of the internal combustion engine 101 is caused to open to enable air having a mass to enter the cylinder. The mass of air that is allowed to enter the cylinder 103 is below a first range of masses that enable the internal combustion engine to provide combustion torque. I.e. during normal operation of the engine 101, when the engine 101 is caused to produce combustion torque, air is drawn into the cylinder 103 and fuel is injected, and the mixture is subsequently ignited. During such normal operation, the mass of air that is drawn into the cylinder 103 is within a first range of masses, all of which are capable of providing combustion torque. However, during a period in which fuel to the engine 101 is cut, only a relatively very small mass of air, that is smaller than the smallest mass in the first range of masses is allowed to enter the cylinder 103 during each intake stroke. In embodiments of the invention, the very small mass of air is no more than one third of the smallest mass in the first range of masses that are used to provide combustion torque during normal operation of the engine 101. In the present embodiment, the very small mass of air is no more than one fifth of the smallest mass in the first range of masses that are used to provide combustion torque during normal operation of the engine 101.

It may be noted that the masses of air in the first range of masses are sufficiently large to enable the engine 101 to generate combustion torque. However, the very small mass of air entering the cylinders 103 during fuel cut is so small that it would be incapable of enabling the engine 101 to provide combustion torque, if fuel were present. i.e. if the cylinders 103 of the engine 101 were provided with the very small mass of air and a corresponding mass of fuel during intake strokes, the very small mass of air would be insufficiently large to provide stable combustion and so the engine 101 would misfire and consequently slow to a stop.

Figure 5:
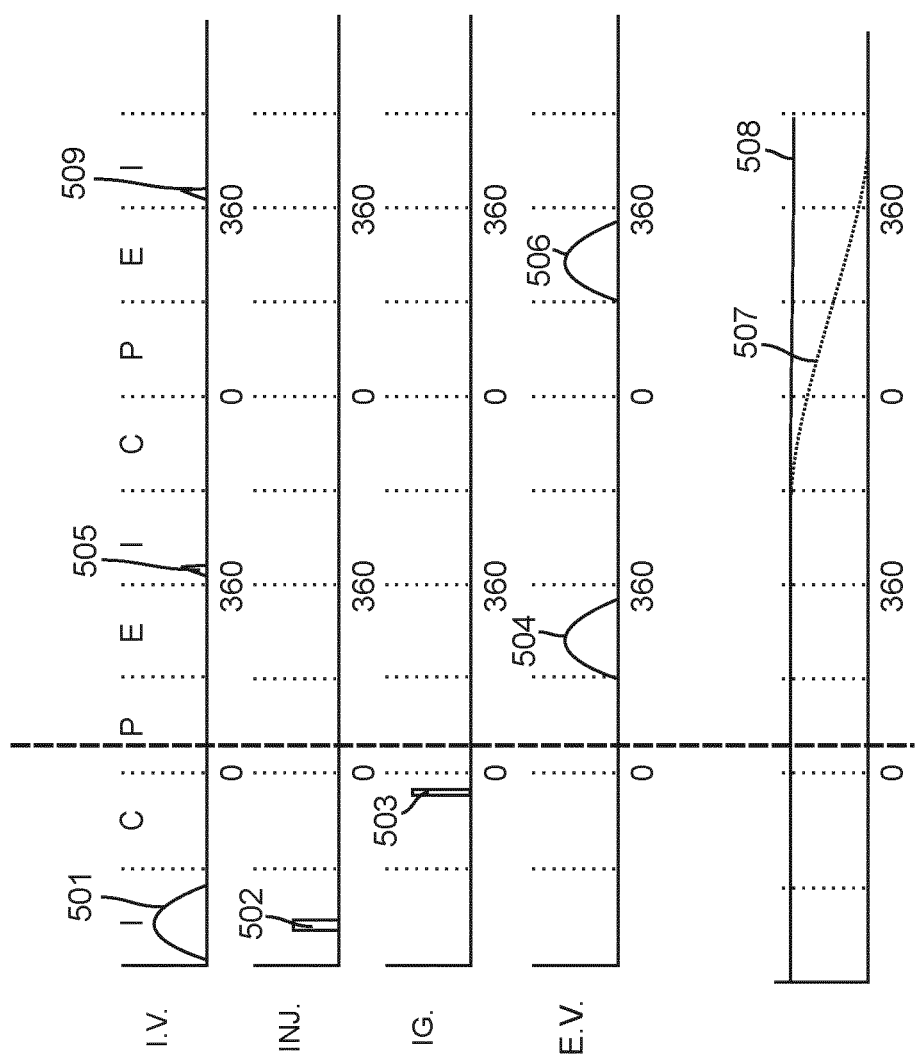
FIG. 5 shows graphs illustrating an example of the start of a fuel cut period following normal operation of a cylinder of the engine.

Graphs illustrating an example of the start of a fuel cut period following normal operation of a cylinder 103 of the engine 101 are shown in FIG. 5. The graphs illustrate (listed from top to bottom of FIG. 5) intake valve lift (I.V), fuel injection (INJ.), ignition (IG.), exhaust valve lift (E.V.) and rotation speed of the engine 101 or the crankshaft 318, (illustrated by the bottom graph) with respect to crankshaft angle. It may be noted that all of the graphs illustrate the same crankshaft angles on the horizontal axis.

Initially, during an intake stroke (I) of the cylinder 103, the lift 501 of the intake valve 200 is maximised, and fuel is injected 502 during the intake stroke. The mixture of fuel and air is then ignited 503 towards the end of the next following compression stroke (C) so that combustion takes place during the subsequent power stroke (P). The exhaust valve 302 is then lifted 504 during the following exhaust stroke (E) to enable the products of the combustion to be expelled from the cylinder 103.

A fuel cut request (illustrated by the dashed line in FIG. 5) is received during the power stroke (P), and before the controller 104 has determined a schedule for the next opening of the intake valve 200. Consequently, during the intake stroke (I) next following the receipt of the fuel cut request, the controller 104 causes the valve actuation means 206 to lift 505 the intake valve 200 but then close it shortly afterwards so that only a small mass of air is able to enter the cylinder 103. Only a small mass of air is then expelled during the subsequent exhaust stroke 506.

In instances where the fuel cut request is received while the vehicle 101 is stationary, the engine 101 may soon come to a stop as illustrated by curve 507. Alternatively, for example, when the vehicle 100 is travelling along a road and the fuel cut is caused by releasing the accelerator pedal 105, the engine 101 may continue to rotate due to momentum, as illustrated by the curve 508. In such instances the intake valve 200 continues to be lifted 509 during its one or more intake strokes following the intake stroke (with valve lift 505) before a request for combustion torque is once again received. However, the lifts 509 during fuel cut are only sufficient to enable a small mass of air to be drawn into the cylinders 103, i.e. a mass that is less than the first range of masses suitable for providing combustion torque.

Figure 6:
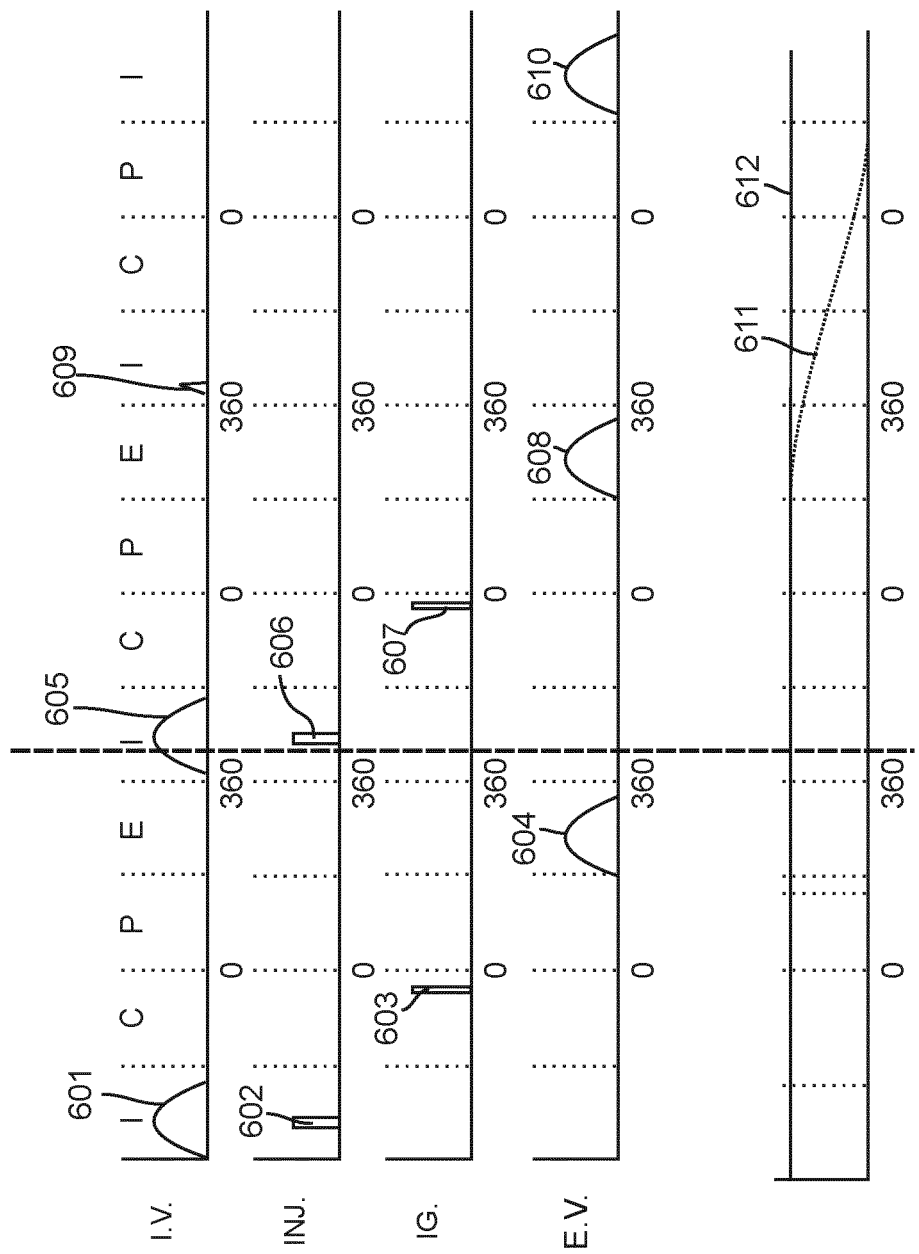
FIG. 6 shows graphs illustrating another example, similar to that of FIG. 5.

Graphs similar to those of FIG. 5, illustrating another example of the start of a fuel cut period following normal operation of a cylinder 103 of the engine 101 are shown in FIG. 6. The graphs illustrate (listed from top to bottom of FIG. 6) intake valve lift (I.V), fuel injection (INJ.), ignition (IG.), exhaust valve lift (E.V) and rotation speed of the engine 101 or the crankshaft 318 (illustrated by the bottom graph) with respect to crankshaft angle (horizontal axis of all graphs).

Initially in the graphs shown in FIG. 6, during an intake stroke (I) of the cylinder 103, the lift 601 of the intake valve 200 is maximised, and fuel is injected 602. The mixture of fuel and air is then ignited 603 towards the end of the next following compression stroke (C) so that combustion takes place during the subsequent power stroke (P). The exhaust valve 302 is then lifted 604 during the following exhaust stroke (E) to enable the products of the combustion to be expelled from the cylinder 103.

In this example, the fuel cut request (illustrated by the dashed line in FIG. 6) is received during an intake stroke (I) and while the intake valve 200 is open, i.e. it is received after the intake valve 200 has been lifted 605 to allow a mass of air suitable for combustion to enter the cylinder 103. Consequently, fuel injection 606 is allowed to take place before the intake valve 200 is closed and the fuel and air mixture is ignited 607, so that combustion products are exhausted 608 via the catalytic converter 209.

However, following receipt of the fuel cut request, the controller 104 schedules opening and closing of the intake valve 200 such that only a small mass of air is allowed to enter the cylinder 103 during the intake stroke next following the closing of the intake valve 200 at the end of the valve lift 605. Thus, the intake valve 200 is caused to open 609 but close soon afterwards. Consequently, in the next following exhaust stroke (E) 610 only a small mass of air is exhausted to the catalytic converter 209.

As mentioned above, in instances where the fuel cut request is received while the vehicle 101 is stationary, the engine 101 may soon come to a stop as illustrated by curve 611. Alternatively, for example, when the vehicle 100 is travelling along a road and the fuel cut is caused by releasing the accelerator pedal 105, the engine 101 may continue to rotate due to momentum, as illustrated by the curve 612.

Figure 7:
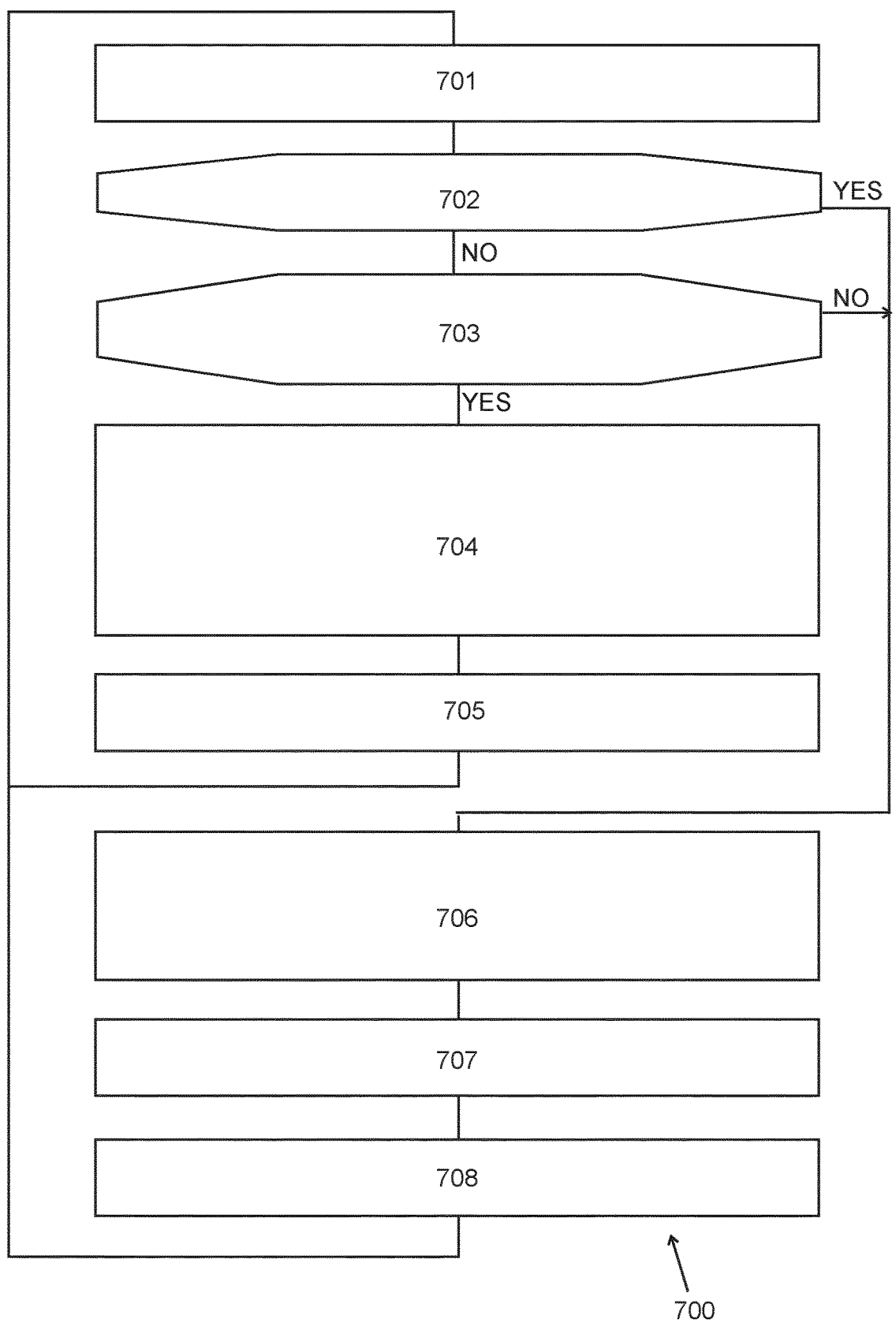
FIG. 7 shows a flowchart of a method of controlling operation of an internal combustion engine, which illustrates an example of the method shown in FIG. 4.

A flowchart of a method 700 of controlling operation of an internal combustion engine 101, which illustrates an example of the method 400, is shown in FIG. 7. At block 701 of the method 700, a request signal is received. The request signal may be a request for an amount of combustion torque to be provided by the engine 101 or alternatively it may be a request for no combustion torque, i.e. a request for fuel to the engine to be cut. At block 702 it is determined whether the request signal indicates that combustion torque is required, and, if so, then at block 706 the intake valve 200 is caused to open to enable a mass of air in a first range of masses to enter the cylinder 103 during the intake stroke in which fuel is to be combusted in the next following power stroke of the cylinder 103. At block 707 fuel is caused to be injected into the cylinder 103 while the intake valve 200 is open, and at block 708 the fuel and air mixture in the cylinder 103 is caused to be ignited to provide torque during the power stroke.

Alternatively, if it is determined at block 702 that the request signal does not indicate that torque is required, i.e. a fuel cut request has been received, then it is determined at block 703 whether it is possible to perform required scheduling of opening of the intake valve 200 for the intake stroke that occurs before the next power stroke. For example, as illustrated in the graphs of FIG. 5, the fuel cut request may be received sufficiently early so that the opening and closing of the intake valve (shown at 505) can be scheduled to only allow a small mass of air into the cylinder 103. In such a situation, where the required scheduling is possible, the processes at blocks 704 and 705 are performed.

In an alternative embodiment, the scheduling of opening of the intake valve 200 is itself performed at a specific timing determined by the angle of the crankshaft 318. For example, the scheduling of opening of the intake valve 200 may always be performed at a specified timing during the previous power stroke of the cylinder 103. In such an embodiment, the process at block 703 does not exist because the request for fuel cut is either received in time to enable the reduced opening of the intake valve 200 to be scheduled for the next intake stroke, in which case the reduced opening is scheduled, or it is not received in time, in which case it is not.

At block 704 the intake valve 200 of the cylinder 103 is caused to be opened to enable a mass of air in a second range of masses to enter the cylinder during the next following intake stroke. The second range of masses are all smaller than the first range of masses, i.e. the largest mass of the second range of masses is smaller than the smallest mass of the first range of masses. Masses of air in the first range of masses are used by the engine 101 to produce combustion in the cylinder 103 when combustion torque is required. However, masses of air that are below the first range of masses, and all those within the second range of masses, are incapable of providing combustion in the cylinder 103 to produce combustion torque. I.e. as described above, even if a corresponding mass of fuel were provided to the cylinders 103 of the engine 101 along with the mass of air in the second range of masses, and ignition were continued, the engine 101 would misfire and slow to a stop.

At block 705 injection of fuel into the cylinder 103 is prevented, so that only air enters the cylinder 103 during the intake stroke. Ignition may also be prevented on the following compression stroke.

Alternatively, if it is determined at block 703 that it is not possible to perform scheduling of the opening of the intake valve 200 that occurs in the intake stroke before the next power stroke, then the processes at blocks 706 to 708 are performed. For example, as illustrated in the graphs of FIG. 6, when the most recent request signal is received, the intake valve 200 may be already open during an intake stroke in which ignition is scheduled to occur during the next following compression stroke. In such an instance, the required scheduling is not possible and so the processes at blocks 706 to 708 are performed. Alternatively, the intake valve 200 may be already scheduled to open to enable a mass of air in the first range of masses to enter the cylinder 103 and rescheduling may not be possible before the intake valve 200 is opened. An example of this is illustrated in the graphs of FIG. 8.

Figure 8:
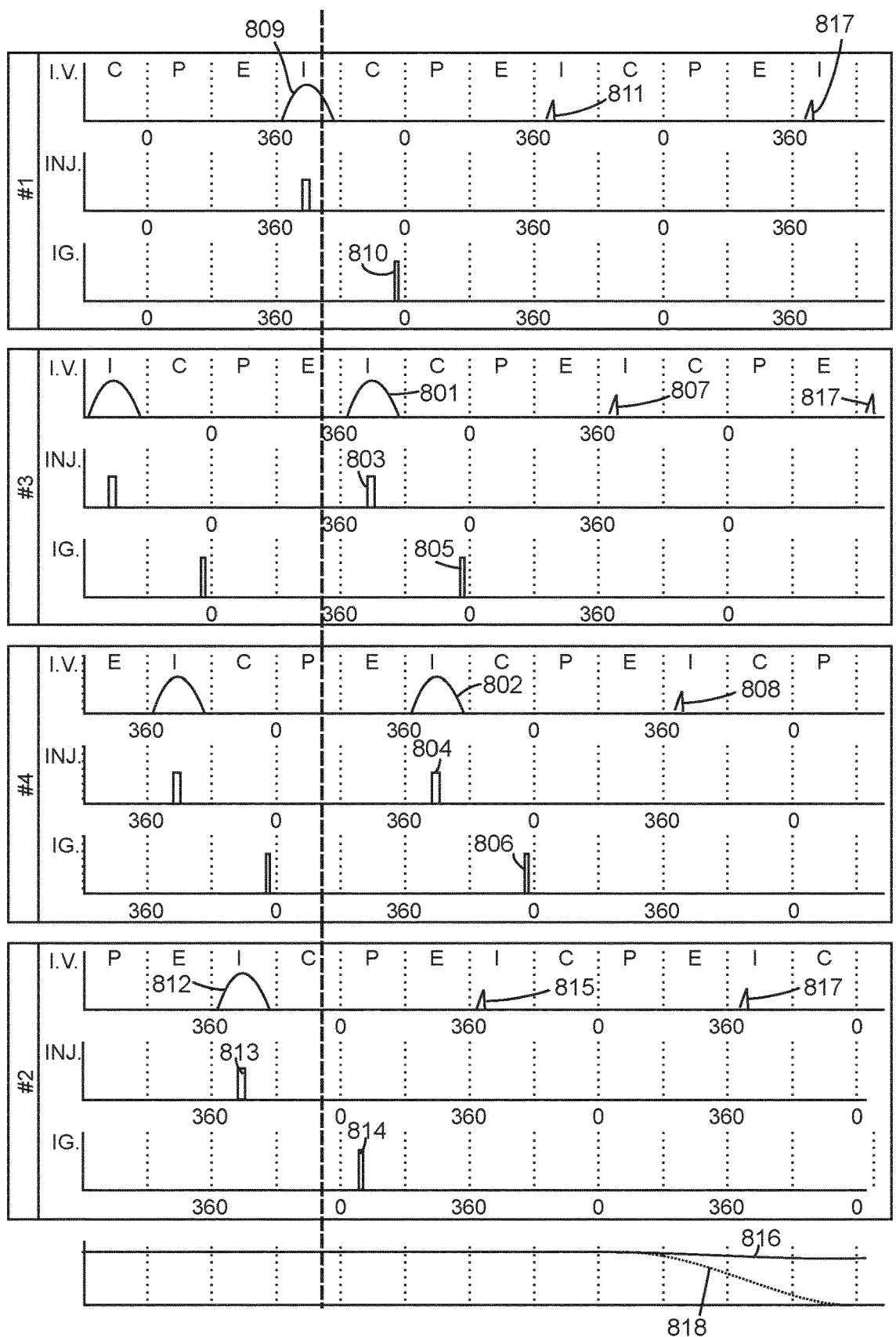
FIG. 8 shows graphs illustrating an example of control of cylinders of an engine during the start of a fuel cut period following normal operation of the engine.

FIG. 8 shows graphs of the rotational speed of the engine 101 in revolutions per minute (RPM) (bottom graph), intake valve (I.V.) position, fuel injection (INJ.) and ignition (IG.) for each of its four cylinders (#1, #2, #3 and #4), against crankshaft angle during a period in which a fuel cut request (illustrated by the dashed line spanning all graphs) is received. Although not illustrated in FIG. 8, it should be understood that the one or more exhaust valves 302 of each cylinder 103 are open for a finite period during each exhaust stroke.

Before the fuel cut request is received, the intake valve 200 of each cylinder 103 is opened and closed during intake strokes (I) of the cylinder 103, and while the intake valve 200 of a cylinder 103 is open, fuel is injected into the respective cylinder. Towards the end of each compression stroke (C) of each cylinder 103, the fuel in that cylinder 103 is ignited.

A fuel cut request is received during the exhaust stroke (E) of cylinder #3 and the power stroke of cylinder #4. Scheduling of opening of the intake valves 200 for these two cylinders has already been performed and consequently their intake valves are lifted 801 and 802, fuel is injected 803 and 804 and ignition is performed 805 and 806 in order to produce combustion during their next power strokes (P). However, schedules of the opening of their intake valves 200 during the intake strokes next following the final ignitions 805 and 806 are determined in dependence on the fuel cut request and consequently the intake valves 200 are lifted 807 and 808 but closed shortly after opening, so that only a small mass of air is drawn into the cylinders #3 and #4.

The fuel cut request is received during an intake stroke (I) of cylinder #1 in which the intake valve 200 has already been lifted 809. Consequently, combustion takes place following ignition 810 of the air and fuel mixture. However, a schedule of the opening of its intake valve 200 during the intake stroke (I) next following the final ignition 810 is determined in dependence on the fuel cut request and consequently the intake valve 200 of cylinder #1 is lifted 811 but closed shortly after opening, so that only a small mass of air is drawn into the cylinder #1.

The fuel cut request is received during a compression stroke (C) of cylinder #2 following an intake stroke (I) in which the intake valve 200 was lifted 812 and fuel was injected 813. Consequently, combustion takes place following ignition 814 of the air and fuel mixture towards the end of the compression stroke (C). However, a schedule of the opening of its intake valve 200 for the intake stroke (I) next following the ignition 814 is determined in dependence on the fuel cut request and consequently the intake valve 200 of cylinder #2 is lifted 815 but closed shortly after opening, so that only a small mass of air is drawn into the cylinder #2.

In instances where the fuel cut request is received while the vehicle 101 is stationary, the engine may soon come to a stop as illustrated by curve 818. Alternatively, for example, when the vehicle 100 is travelling along a road and the fuel cut is caused by releasing the accelerator pedal 105, the engine 101 may continue to rotate due to momentum, as illustrated by the curve 816, until a request for further combustion torque is received. In such instances the intake valves 200 continue to be lifted 817 during their subsequent one or more intake strokes (I) (following the intake strokes with lifts 811, 807, 808 and 815) but the subsequent lifts 817 are only sufficient to enable a small mass of air to be drawn into the cylinders 103, i.e. a mass that is less than the first range of masses for providing combustion torque.

Figure 9:
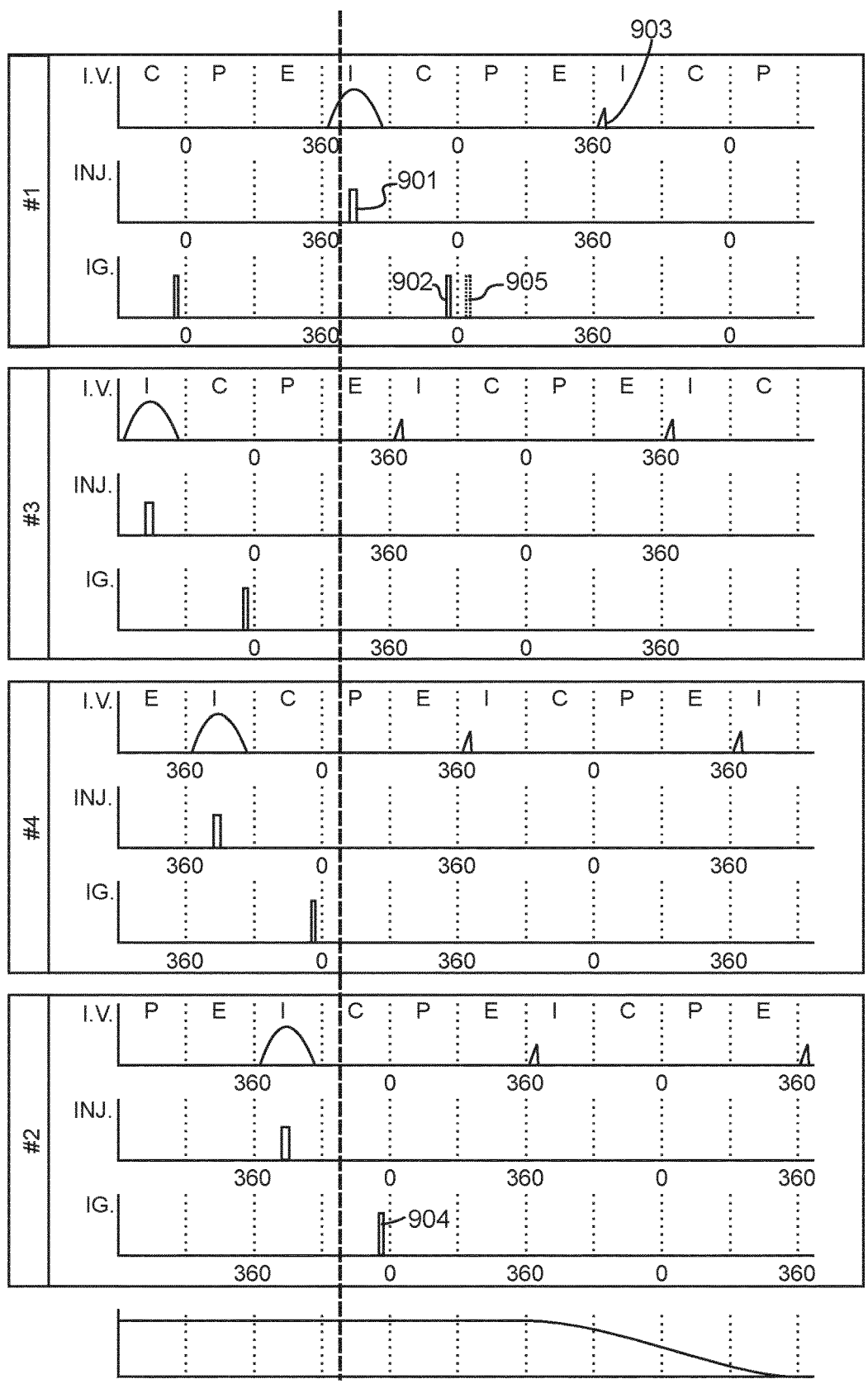
FIG. 9 shows graphs illustrating another example of control of cylinders of an engine, similar to those of FIG. 8.

Another example of the control of an engine 101 is illustrated in the graphs of FIG. 9, which includes graphs of the rotational speed of the engine in revolutions per minute (RPM) (bottom graph), intake valve (I.V.) position, fuel injection (INJ.) and ignition (IG.) for each of its four cylinders (#1, #2, #3 and #4) against crankshaft angle, during a period in which a fuel cut request (illustrated by the dashed line spanning all graphs) is received.

Before the fuel cut request is received, the intake valve 301 of each cylinder 103 is opened and closed during intake strokes (I) of the cylinder 103, and while the intake valve 200 of a cylinder 103 is open, fuel is injected into the respective cylinder. Towards the end of each compression stroke (C) of each cylinder 103, the fuel in that cylinder 103 is ignited.

In the example of FIG. 9, when the fuel cut request signal is received, the intake valve 200 of cylinder #1 is open and therefore fuel is injected 901 into the cylinder 103 and subsequently ignited 902 towards the end of the compression stroke (C) to produce a final burn. However, in one embodiment, the final ignition may be scheduled to occur just after the start of the power stroke (P), as indicated at 905. This causes less power to be directed to generating torque and more energy to be provided to the catalytic converter 209. This can therefore assist in keeping the catalytic converter 209 at an operating temperature during a fuel cut period, so that the catalytic converter performs more efficiently when combustion torque production is recommenced.

After the final ignition 902 (or 905), the intake valve 200 of cylinder #1 is then only opened with a small short lift 903 in any subsequent revolutions of the engine 101 until a request for combustion torque is received.

The intake valves 200 of the other cylinders 103 (#2, #3 and #4) represented in FIG. 9 are closed at the time that the fuel cut request signal is received, and consequently the intake valves 200 of those cylinders (#2, #3 and #4) are scheduled, for the current and subsequent revolutions of the engine 101, to only open for a short time during each intake stroke (I) to allow a small mass of air to be drawn into the cylinder. In the case of cylinder #2, when the fuel cut request is received the piston 301 is on its compression stroke (C), the cylinder #2 having just received fuel and air during its previous intake stroke (I). Consequently, ignition 904 is allowed to occur during the compression stroke (C) of cylinder #2, so that combustion takes place in the power stroke (P) that next follows the fuel cut request, and combustion products are exhausted to the catalytic converter 209 during the subsequent exhaust stroke (E).

Figure 10:
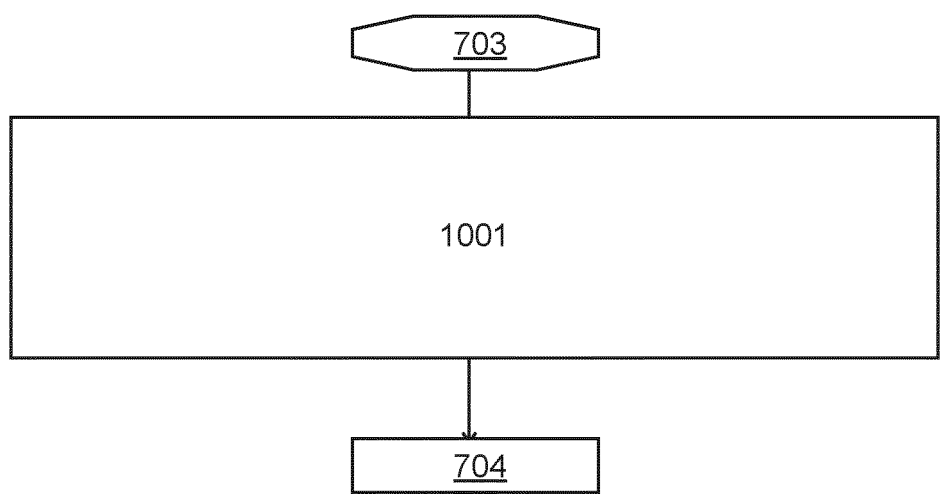
FIG. 10 shows a flowchart illustrating an additional process that is included in some embodiments of the method of FIG. 7.

An additional process 1001 that is included in some embodiments of the method 700 is illustrated in FIG. 10. The additional process 1001 is performed before the process at block 704, in which the intake valve 200 is caused to lift by a reduced amount (of height and/or time) to allow only a small mass of air (below the first range of masses) into its cylinder 103. The additional process 1001 comprises causing a throttle valve 214 to close to a position that restricts a mass flow rate of air though the throttle valve 214 to a time-averaged mass flow rate into the cylinders 103 of the internal combustion engine 101 that occurs when the lift of the intake valves 200 is reduced, as at block 704. I.e. With the throttle valve 214 closed to a defined position (such as completely closed), reduced pressure that exists in the intake manifold 215 causes air to leak around the throttle valve 214 at a rate of flow that can be predetermined, or determined, by a pressure sensor (216 show in FIG. 2) located on the intake manifold 215. The reduced lift of the intake valves 200 is arranged to provide an average mass flow rate of air into the cylinders 103 that is the same as the mass flow rate of air leaking around the throttle valve 214 so that the reduced pressure in the intake manifold is kept stable and below a maximum pressure.

As discussed above, keeping the air pressure in the intake manifold 215 low, and similar to the pressure normally found in the intake manifold 215 during normal operation, enables the controller 104 to accurately control the air that is drawn into the cylinders 103 of the engine 101 when internal combustion recommences, and consequently combustion torque may be re-introduced smoothly.

Figure 11:
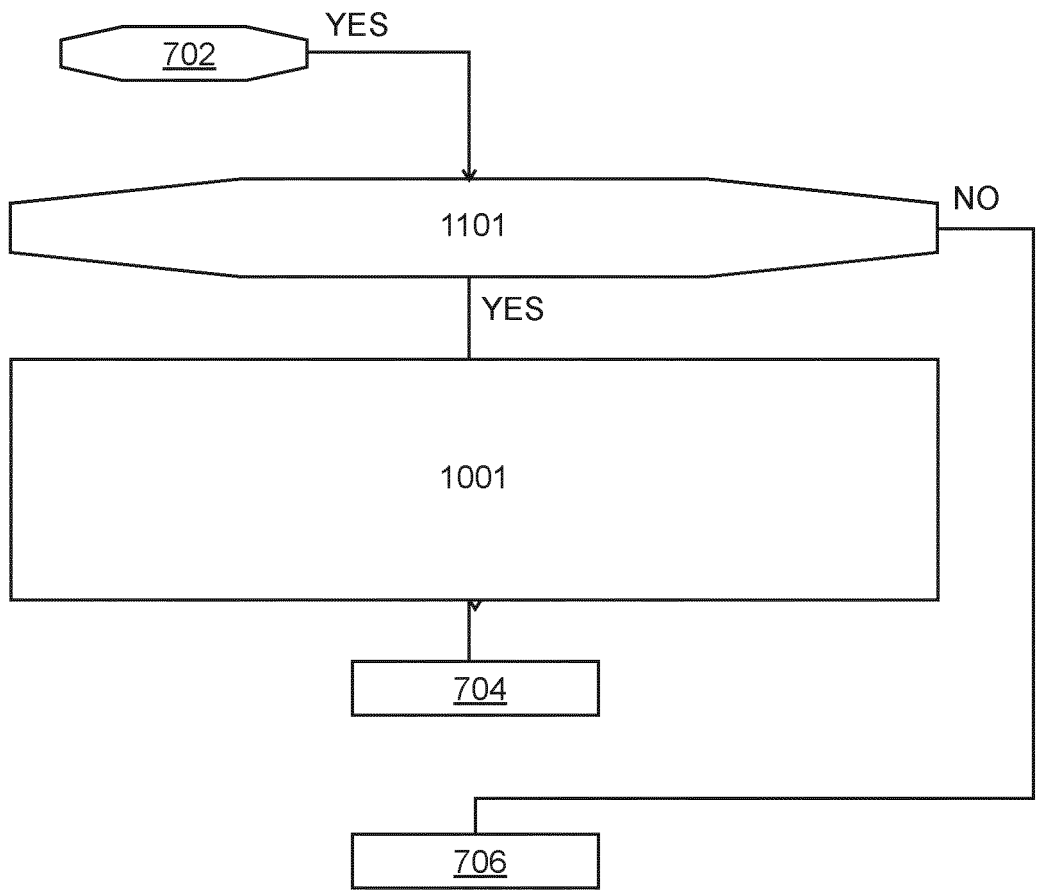
FIG. 11 shows a flowchart illustrating additional processes that may be included within the method of FIG. 7.

A flowchart illustrating additional processes that may be included within the method 700 is shown in FIG. 11. The processes are intended to allow the engine to be restarted smoothly following a period in which the engine 101 has been stationary. In instances where it is determined at block 702 that combustion torque is required, it is firstly determined at block 1101 whether the engine 101 is within a period just following a request to start the engine 101. If it is not in such a period then the processes 706 to 708 may be performed as described above. However, if it is determined that the engine 101 is within such a period, the additional process 1001 described with reference to FIG. 10 is performed, so that the throttle valve 214 is caused to close to (or remain at) a position that restricts a rate of flow through the throttle valve 214. The intake valve 200 of the cylinder 103 is then only opened sufficiently to allow a small mass of air, below the first range of masses, to enter the cylinder 103.

The period just following a request to start the engine 101 may correspond to the first stroke performed by the pistons 301 of the cylinders 103 or the first few initial strokes performed by the pistons 301 following the receipt of the request.

Figure 12:
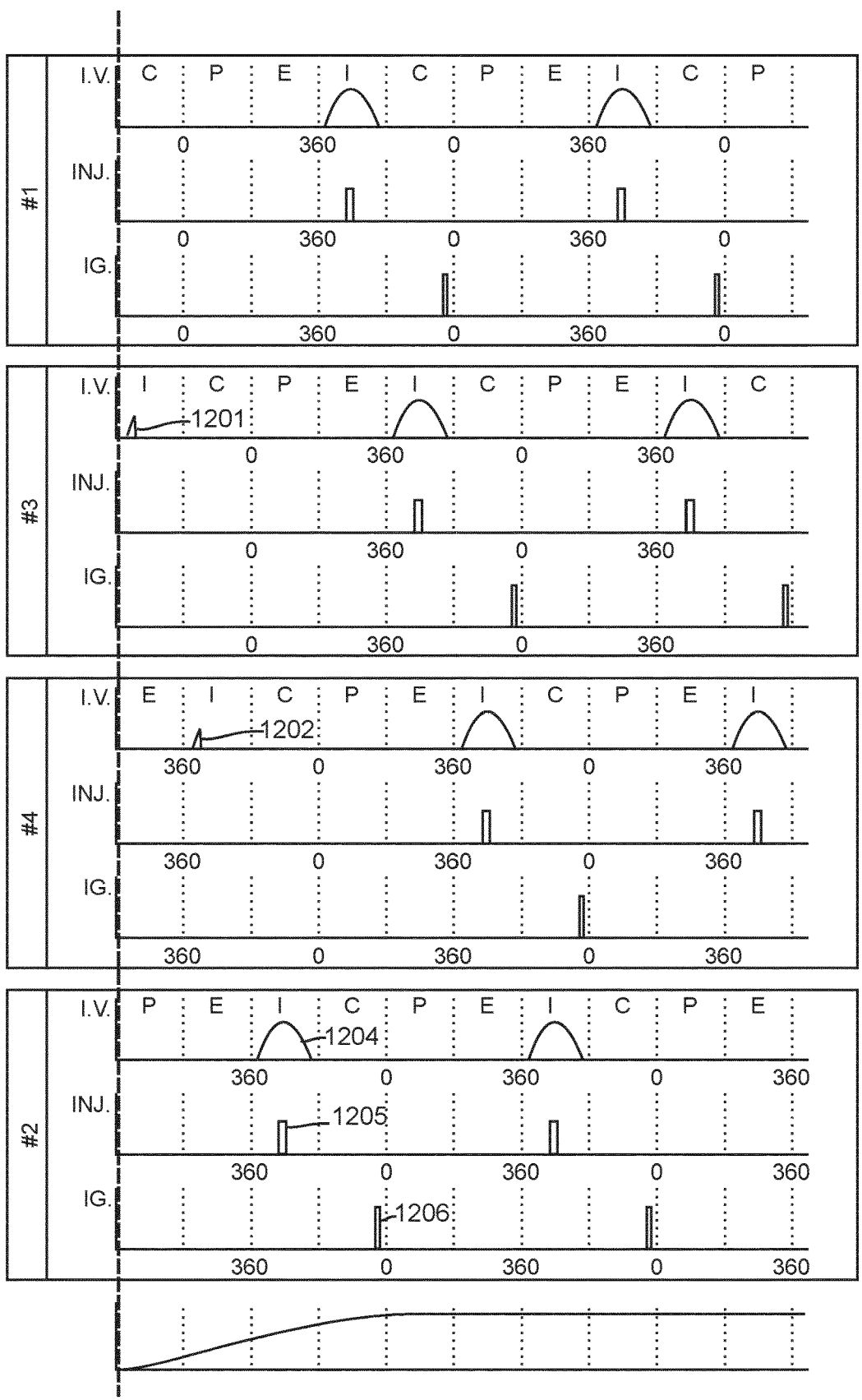
FIG. 12 shows graphs illustrating an example of control of cylinders of an engine during starting of the engine.

An example of the process illustrated by the flowchart in FIG. 11 is illustrated by the graphs of FIG. 12, which show engine speed as it increases from zero (bottom graph), along with intake valve (I.V) position, fuel injection (INJ.) timing, and ignition (IG.) timing for the four cylinders (#1, #2, #3 and #4) 103 of the engine 101 during its first revolutions after receipt of a start request signal. Initially, the engine 101 is rotated by the secondary torque source 102. The rate at which the speed of the output of the engine 101 increases from zero up to idle speed (e.g. 700 revolutions per minute) under the action of the secondary torque source 102 is known, for example from prior measurements, and therefore the angle through which the engine 101 must be rotated before a first ignition is required is also known.

In the present example, the first power stroke (P) is required to occur when the engine 101 has approximately reached its idle speed, and therefore the first ignition is required after the engine 101 has turned through about 720 degrees. In this instance the cylinder that has its first power stroke (P) when this speed has been achieved is cylinder #2. In preparation to cause combustion during this power stroke (P) of cylinder #2, its intake valve 103 is the first to be opened sufficiently to enable a mass of air in the first range of masses to be drawn into the cylinder after about 360 degrees and fuel is injected.

As shown in FIG. 12, by the time that the intake valve 103 of cylinder #2 is opened, the engine 101 has already reached a speed of more than about 50% of idle speed.

In this example, during starting by the secondary torque source 102, the first cylinders to perform intake strokes (I) are cylinders #3 and #4, but it may be predicted that the engine 101 will not be rotating sufficiently quickly at the time of their first power strokes (P). Therefore, during the first intake stroke (I) of cylinder #3 and cylinder #4, the intake valves 301 of those cylinders are only opened to allow air within the second range of masses to enter the cylinder. I.e. a mass of air is allowed to enter that is below the first range of masses that would be suitable to produce combustion torque. In addition, no fuel is injected. Consequently, there is no combustion during the first power strokes (P) of cylinder #3 and cylinder #4.

By preventing combustion during the first power strokes (P) of the cylinders #3 and #4 in the example of FIG. 12, the engine 101 may be accelerated from zero speed in a smooth manner by a secondary torque source, and therefore noise vibration and harshness may be minimised. Also, because the intake valve(s) of cylinders #3 and #4 only allow a small amount of air to enter during the first intake strokes (I), excessive oxidation of the catalytic converter is prevented.

In an alternative embodiment, instead of causing opening of the intake valves 103 during the first intake stroke (I) of one or more cylinders 103 to allow a mass of air below the first range of masses to enter, the intake valves 103 are kept completely closed during those intake strokes (I).

For purposes of this disclosure, it is to be understood that the controller(s) described herein can each comprise a control unit or computational device having one or more electronic processors. A vehicle and/or a system thereof may comprise a single control unit or electronic controller or alternatively different functions of the controller(s) may be embodied in, or hosted in, different control units or controllers. A set of instructions could be provided which, when executed, cause said controller(s) or control unit(s) to implement the control techniques described herein (including the described method(s)). The set of instructions may be embedded in one or more electronic processors, or alternatively, the set of instructions could be provided as software to be executed by one or more electronic processor(s). For example, a first controller may be implemented in software run on one or more electronic processors, and one or more other controllers may also be implemented in software run on one or more electronic processors, optionally the same one or more processors as the first controller. It will be appreciated, however, that other arrangements are also useful, and therefore, the present disclosure is not intended to be limited to any particular arrangement. In any event, the set of instructions described above may be embedded in a computer-readable storage medium (e.g., a non-transitory computer-readable storage medium) that may comprise any mechanism for storing information in a form readable by a machine or electronic processors/computational device, including, without limitation: a magnetic storage medium (e.g., floppy diskette); optical storage medium (e.g., CD-ROM); magneto optical storage medium; read only memory (ROM); random access memory (RAM); erasable programmable memory (e.g., EPROM and EEPROM); flash memory; or electrical or other types of medium for storing such information/instructions.

It will be appreciated that various changes and modifications can be made to the present invention without departing from the scope of the present application.

The blocks illustrated in the FIGS. 4, 7, 10 and 11 may represent steps in a method and/or sections of code in the computer program 211. The illustration of a particular order to the blocks does not necessarily imply that there is a required or preferred order for the blocks and the order and arrangement of the block may be varied. Furthermore, it may be possible for some steps to be omitted.

Although embodiments of the present invention have been described in the preceding paragraphs with reference to various examples, it should be appreciated that modifications to the examples given can be made without departing from the scope of the invention as claimed. Features described in the preceding description may be used in combinations other than the combinations explicitly described. Although functions have been described with reference to certain features, those functions may be performable by other features whether described or not. Although features have been described with reference to certain embodiments, those features may also be present in other embodiments whether described or not.

The invention claimed is:

1. A controller for controlling operation of an internal combustion engine, the controller being configured to:
   during fuel cut, cause opening of an intake valve of a cylinder of the internal combustion engine to enable air having a mass to enter the cylinder; wherein
   the mass is below a first range of masses which enable the internal combustion engine to provide combustion torque, wherein the controller, in dependence on a fuel cut request signal being received while the intake valve is open, or about to be opened having been scheduled, is configured to:
   cause air having a mass in the first range of masses to enter the cylinder;
   cause injection of fuel into the cylinder;
   cause closing of the intake valve; and
   subsequently cause opening of the intake valve to enable air having a mass below the first range of masses to enter the cylinder during the intake stroke of the cylinder next following said closing of the intake valve, and
   wherein the controller is configured to:
   cause ignition of fuel in the cylinder following said closing of the intake valve,
   enable combustion of the fuel in the cylinder during a next power stroke following the closing of the intake valve, and
   cause said ignition only after a piston in the cylinder has reached top dead center.

2. The controller according to claim 1, comprising
   an electronic processor having an electrical input for receiving a request signal; and
   an electronic memory device electrically coupled to the electronic processor and having instructions stored therein,
   the processor being configured to access the memory device and execute the instructions stored therein.

3. The controller according to claim 1, wherein the controller is configured to cause opening of the intake valve to enable a mass of air in the first range of masses to enter the cylinder during all intake strokes of the cylinder in which fuel is combusted during a next power stroke of the cylinder.

4. The controller according to claim 1, wherein
   during fuel cut, the controller is configured to cause opening of the intake valve during each intake stroke of the cylinder to enable a mass of air in a second range of masses to enter the cylinder during each intake stroke; and
   a largest mass in the second range of masses is smaller than a smallest mass in the first range of masses.

5. The controller according to claim 1, wherein
   during fuel cut, the controller is configured to cause opening of the intake valve during each intake stroke of the cylinder to enable a mass of air in a second range of masses to enter the cylinder during each intake stroke; and
   the largest mass in the second range of masses is at least 3 times smaller than the smallest mass in the first range of masses.

6. The controller according to claim 1, wherein the controller is configured to:
   receive a fuel cut request signal indicative of a request to stop fuel being supplied to the engine; and
   cause opening of the intake valve to enable air having a mass below the first range of masses to enter the cylinder during a next intake stroke of the cylinder following receipt of the request signal, in dependence on the intake valve being closed at a time of receipt of the request signal.

7. The controller according to claim 1, wherein the controller is configured to:
   receive a start request signal indicative of a request to increase a rotational speed of an output of the internal combustion engine from zero; and
   cause opening of an intake valve of at least one cylinder of the internal combustion engine to enable air having a mass below the first range of masses to enter during at least a first intake stroke of the at least one cylinder and preventing injection of fuel during the at least a first intake stroke.

8. The controller according to claim 7, wherein the controller is configured to cause only a mass of air below the first range of masses to enter each cylinder of the internal combustion engine until an intake stroke of a cylinder of the internal combustion engine that is expected to have its next power stroke after the internal combustion engine has reached a required speed of rotation or the internal combustion engine has been rotated through a predefined angle.

9. A control system for controlling operation of the internal combustion engine, comprising
   the controller according to claim 1; and
   a valve actuation means configured to cause opening of the intake valve of each cylinder of the internal combustion engine,
   wherein the valve actuation means is configured to control valve lift height and/or valve lift duration in dependence on a signal received from the controller.

10. The control system according to claim 9, wherein the valve actuation means comprises a variable valve lift system.

11. The control system according to claim 10, wherein the variable valve lift system comprises a continuous variable valve lift system and/or a hydraulic system.

12. An internal combustion engine, comprising:
    at least one cylinder;
    an intake valve of the at least one cylinder;
    a least one exhaust valve mechanically actuated by cams fixed to a camshaft; and
    a controller configured to, during fuel cut, cause opening of the intake valve of the at least one cylinder of the internal combustion engine to enable air having a mass to enter the at least one cylinder, wherein the mass is below a range of masses which enable the internal combustion engine to provide combustion torque wherein the controller, in dependence on a fuel cut request signal being received while the intake valve is open, or about to be opened having been scheduled, is configured to:

cause air having a mass in the first range of masses to enter the cylinder;

cause injection of fuel into the cylinder;

cause closing of the intake valve;

subsequently cause opening of the intake valve to enable air having a mass below the first range of masses to enter the cylinder during the intake stroke of the cylinder next following said closing of the intake valve;

cause ignition of fuel in the cylinder following said closing of the intake valve;

enable combustion of the fuel in the cylinder during a next power stroke following the closing of the intake valve; and cause said ignition only after a piston in the cylinder has reached top dead center.

13. The internal combustion engine of claim 12, comprising a valve actuation means configured to cause opening of the intake valve of the at least one cylinder of the internal combustion engine, wherein the valve actuation means is configured to control valve lift height and/or valve lift duration in dependence on a signal received from the controller.

14. A vehicle comprising the internal combustion engine of claim 12.

15. A method of controlling an internal combustion engine comprising, during fuel cut, causing opening of an intake valve of a cylinder of the internal combustion engine to enable air having a mass to enter the cylinder, wherein the mass is below a range of masses which enable the internal combustion engine to provide combustion torque in dependence on a fuel cut request signal being received while the intake valve is open, or about to be opened having been scheduled:

causing air having a mass in the first range of masses to enter the cylinder;

causing injection of fuel into the cylinder;

causing closing of the intake valve;

subsequently causing opening of the intake valve to enable air having a mass below the first range of masses to enter the cylinder during the intake stroke of the cylinder next following said closing of the intake valve;

causing ignition of fuel in the cylinder following said closing of the intake valve;

enabling combustion of the fuel in the cylinder during a next power stroke following the closing of the intake valve; and causing said ignition only after a piston in the cylinder has reached top dead center.

16. A non-transitory computer readable medium comprising computer readable instructions that, when executed by a processor, cause the processor to perform the method according to claim 15.

* * * * *